(12) United States Patent
Lawther et al.

(10) Patent No.: US 6,282,377 B1
(45) Date of Patent: Aug. 28, 2001

(54) DUAL LENS CAMERA

(75) Inventors: Joel S. Lawther, East Rochester; Craig A. Baker, Marion; Martin P. Farcella, Rochester, all of NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/481,820

(22) Filed: Jan. 11, 2000

(51) Int. Cl.⁷ .......................... G03B 17/00; G03B 17/12; G03B 17/14
(52) U.S. Cl. ................................. 396/73; 396/83
(58) Field of Search .................... 396/72, 73, 76, 396/83, 74, 75, 323, 350

(56) References Cited

U.S. PATENT DOCUMENTS

| | | | |
|---|---|---|---|
| Re. 32,959 | * | 6/1989 | Ohmura et al. ...................... 396/106 |
| 382,735 | * | 5/1888 | Rust . |
| 4,451,129 | * | 5/1984 | Ikari et al. ............................. 396/63 |
| 4,482,228 | * | 11/1984 | Fujita . |
| 4,725,864 | * | 2/1988 | Ogawa et al. . |
| 5,084,721 | * | 1/1992 | Burnham . |

* cited by examiner

Primary Examiner—David M. Gray
Assistant Examiner—Rochelle Blackman
(74) Attorney, Agent, or Firm—Roger A. Fields

(57) ABSTRACT

A dual lens camera has a lens carrier with a shorter focal length lens and a longer focal length lens for alternatively positioning only one of the lenses at a picture-taking axis. A single aperture for each one of the lenses is movable forward and rearward along the picture taking axis. The lens carrier is movable forward and rearward along the picture-taking axis in unity with the aperture, and is movable relative to the aperture to position the shorter focal length lens at the picture-taking axis when the aperture is moved rearward along the picture-taking axis and to position the longer focal length lens at the picture-taking axis when the aperture is moved forward along the picture-taking axis.

10 Claims, 8 Drawing Sheets

DUAL LENS CAMERA

FIELD OF THE INVENTION

The invention relates generally to the field of photography, and in particular to a dual lens camera in which a manual selection can be made to change whichever one of at least two different focal length lenses is being used to take a picture to another one of the lenses.

BACKGROUND OF THE INVENTION

Dual lens cameras in which a manual selection can be made to change whichever one of at least two different focal length lenses is being used to take a picture to another one of the lenses are well known.

For example, prior art U.S. Pat. No. 5,084,721 issued Jan. 28, 1992 discloses a dual lens camera including a lens carrier with a shorter focal length lens and a longer focal length lens for alternatively positioning only one of the lenses at a picture-taking axis. The lens carrier is pivoted outward from a main body part an initial angular increment to position the shorter focal length lens at the picture-taking axis and an additional angular increment to remove the shorter focal length lens from the picture-taking axis and position the longer focal length lens at the picture-taking axis. Respective shutters and associated fixed apertures are provided on the lens carrier for the shorter and longer focal length lenses.

Another example, prior art U.S. Pat. No. 4,725,864 issued Feb. 16, 1988 discloses a dual lens camera including a lens barrel with a shorter focal length lens and a longer focal length lens that is movable forward and rearward along the picture-taking axis. The longer focal length lens is pivotable to and from the picture-taking axis, and the shorter focal length lens remains at the picture-taking axis. When the lens barrel is moved forward, the longer focal length lens is pivoted to the picture-taking axis to be optically aligned with the shorter focal length lens. When the lens barrel is moved rearward, the longer focal length lens is pivoted from the picture-taking axis to leave only the shorter focal length lens at the picture-taking axis.

SUMMARY OF THE INVENTION

A dual lens camera comprising a lens carrier with a shorter focal length lens and a longer focal length lens for alternatively positioning only one of the lenses at a picture-taking axis, is characterized in that:

a single aperture for each one of the lenses is movable forward and rearward along the picture taking axis; and the lens carrier is movable forward and rearward along the picture-taking axis in unity with the aperture, and is movable relative to the aperture to position the shorter focal length lens at the picture-taking axis when the aperture is moved rearward along the picture-taking axis and to position the longer focal length lens at the picture-taking axis when the aperture is moved forward along the picture-taking axis.

DETAILED DESCRIPTION OF THE INVENTION

Figure 1:
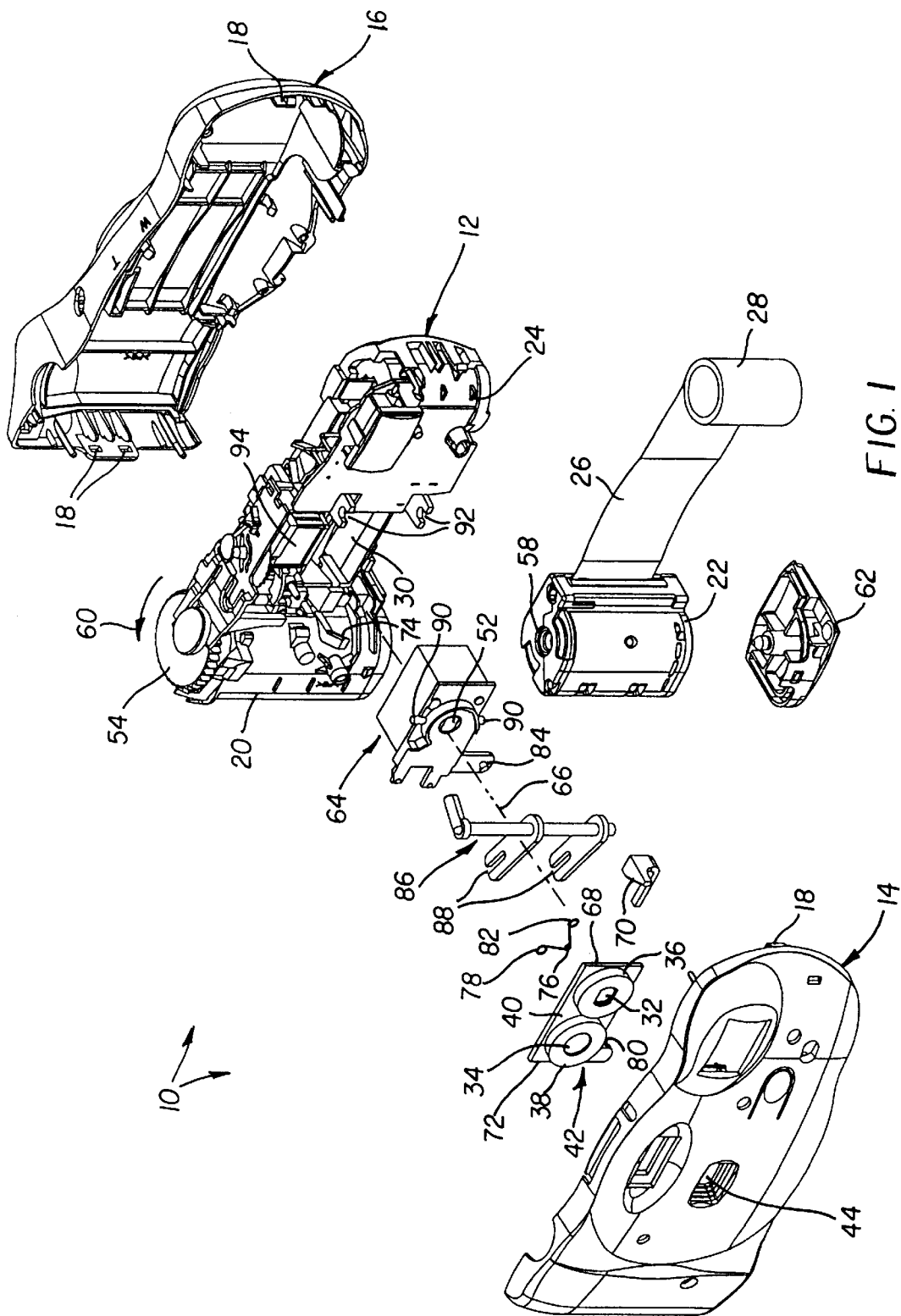
FIG. 1 is an exploded front perspective view of a one-time-use camera including a lens-carrier with a shorter focal length lens and a longer focal length lens for alternatively positioning only one of the lenses at a picture-taking axis, according to a preferred embodiment of the invention.

The invention is disclosed as being embodied preferably in a dual lens camera. Because the features of a dual lens camera are generally known, the description which follows is directed in particular only to those elements forming part of or cooperating directly with the disclosed embodiment. It is to be understood, however, that other elements may take various forms known to a person of ordinary skill in the art.

Referring now to the drawings, FIGS. 1–10 show a so-called one-time-use, single-use, or disposable camera 10. The one-time-use camera 10 includes a plastic opaque main body part 12, a plastic opaque front cover part 14, and a plastic opaque rear cover part 16. The front cover part 14 and the rear cover part 16 house the main body part 12 between them and are connected releasably to one another and to the main body part 12 via known flexible hook-in-hole connections 18.

Figure 2:
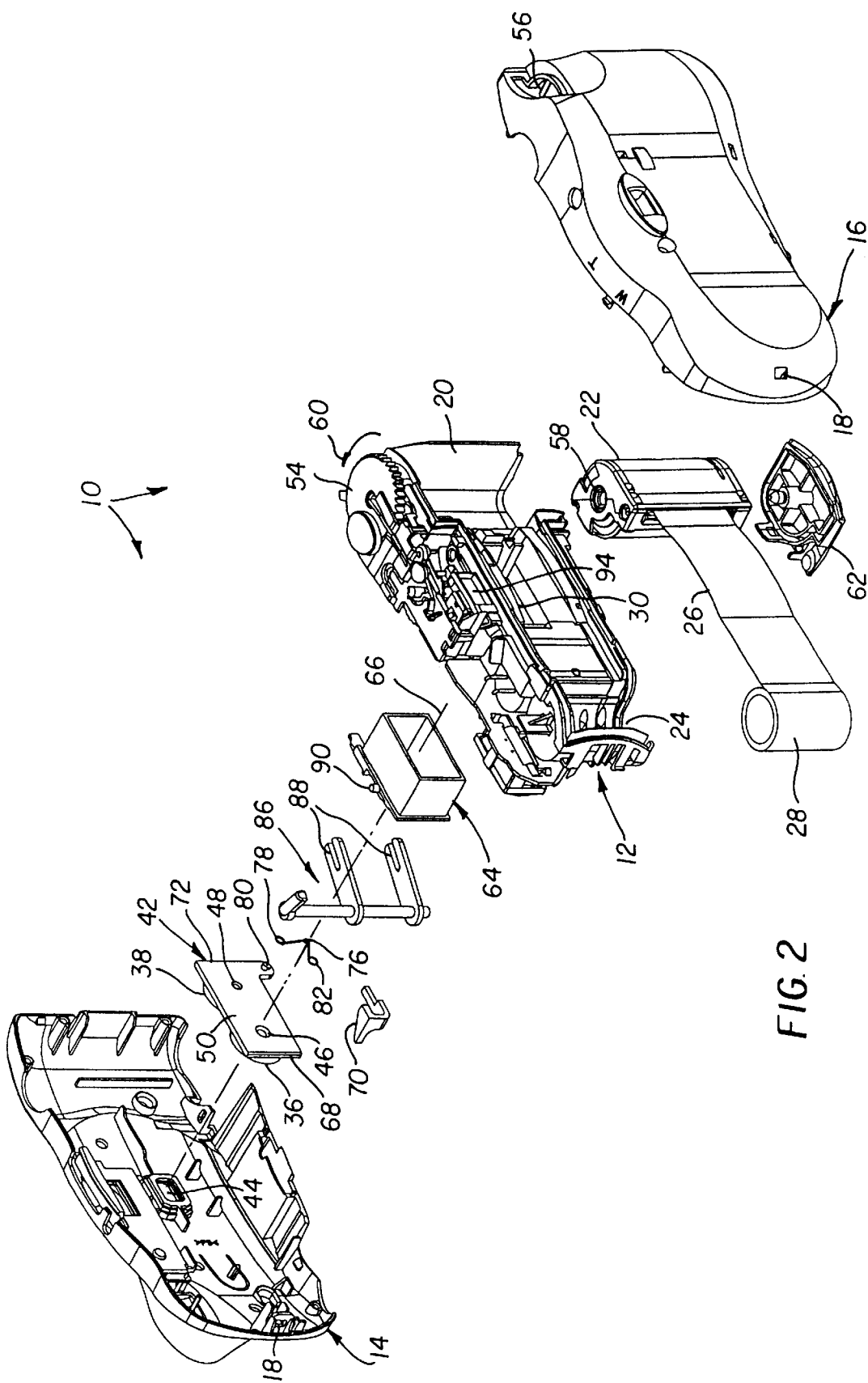
FIG. 2 is an exploded rear perspective view of the camera as seen in FIG. 1.
Figure 3:
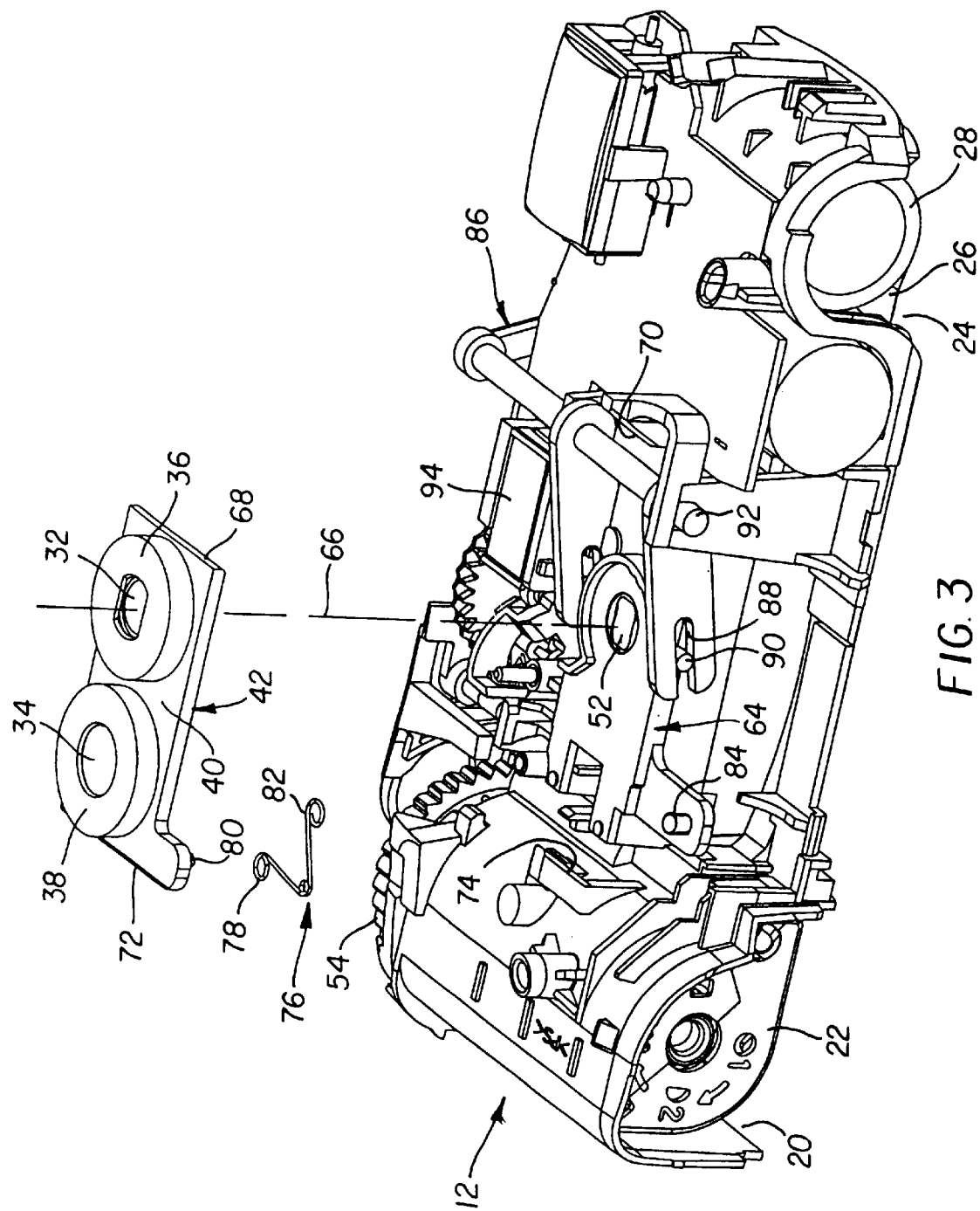
FIG. 3 is a partially exploded front perspective view of the camera with a front cover part removed for clarity purposes, showing the lens carrier moved to position the shorter focal length lens at the picture-taking axis.
Figure 4:
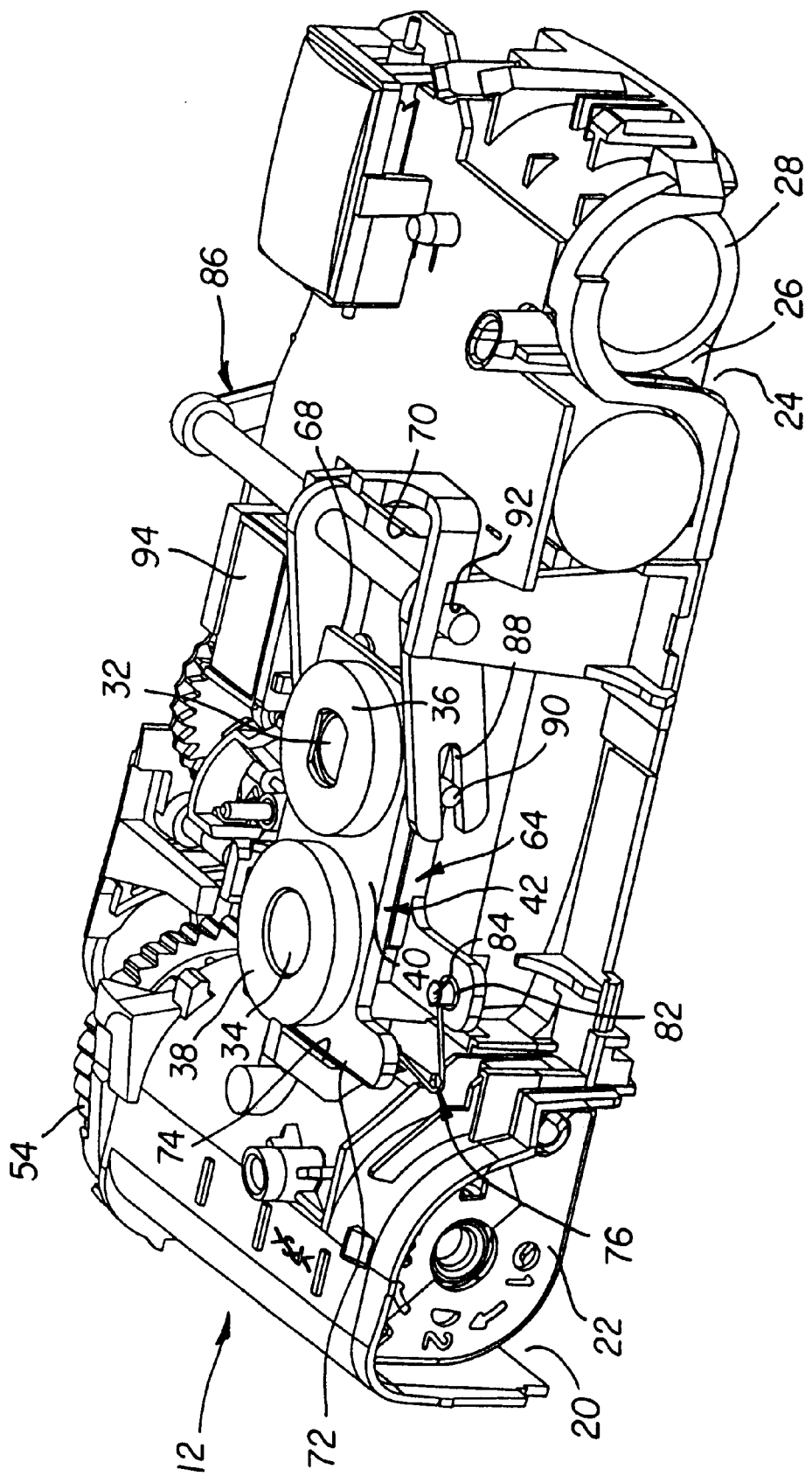
FIG. 4 is a an assembled front perspective view of the camera similar to FIG. 3.
Figure 5:
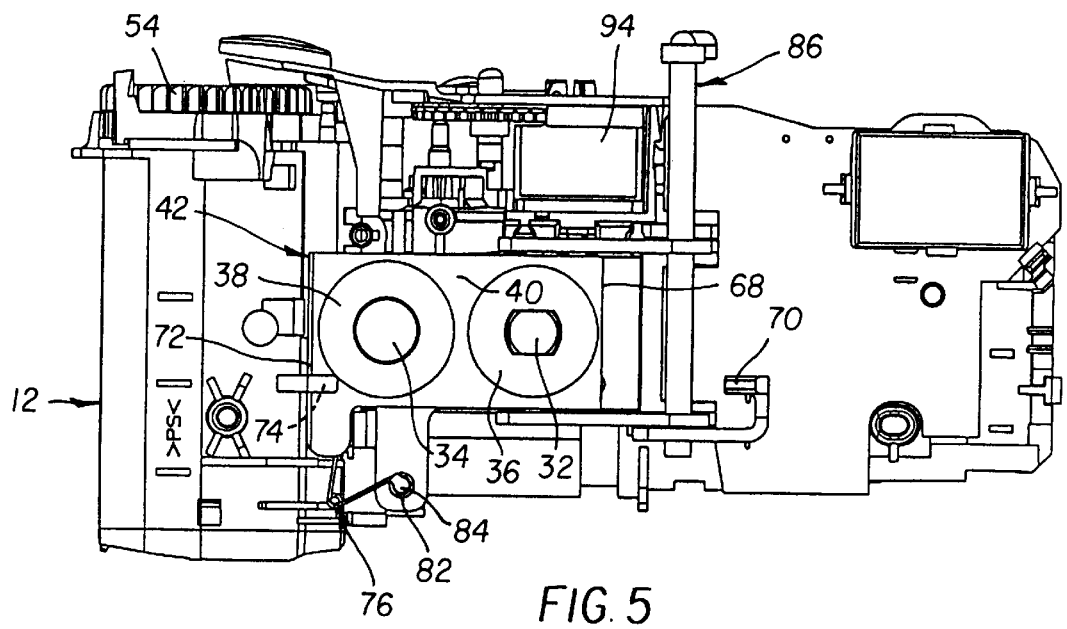
FIG. 5 is front elevation view of the camera with the front cover part removed, showing the lens carrier moved to position the shorter focal length lens at the picture-taking axis.
Figure 6:
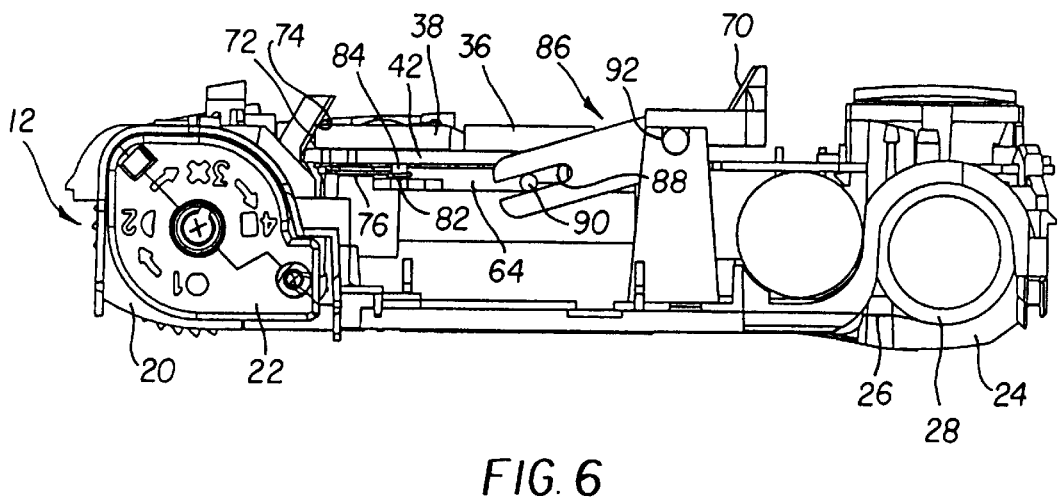
FIG. 6 is a bottom plan view of the camera as seen in FIG. 5.
Figure 7:
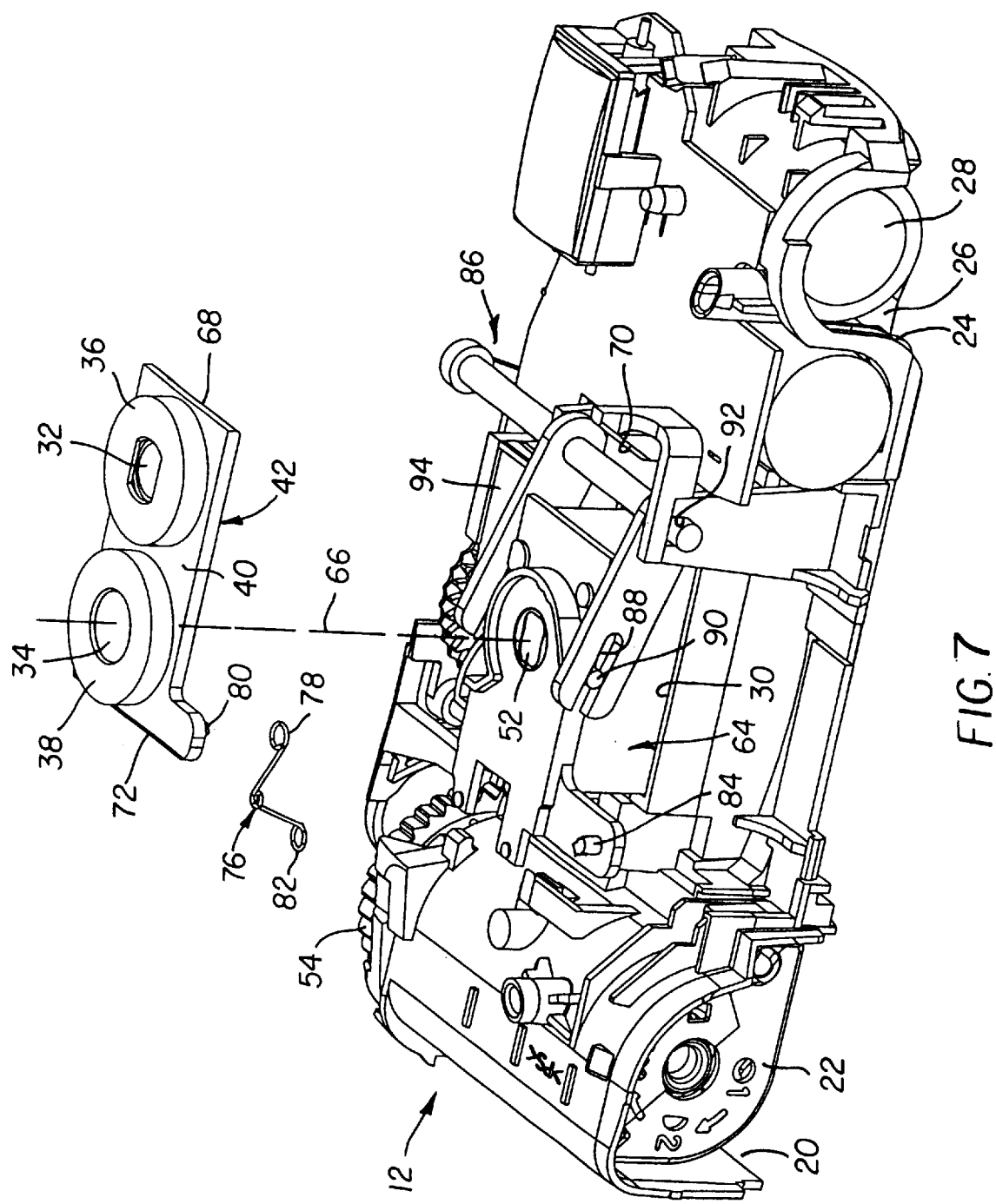
FIG. 7 is a partially exploded front perspective view of the camera with the front cover part removed, showing the lens carrier moved to position the longer focal length lens at the picture-taking axis.
Figure 8:
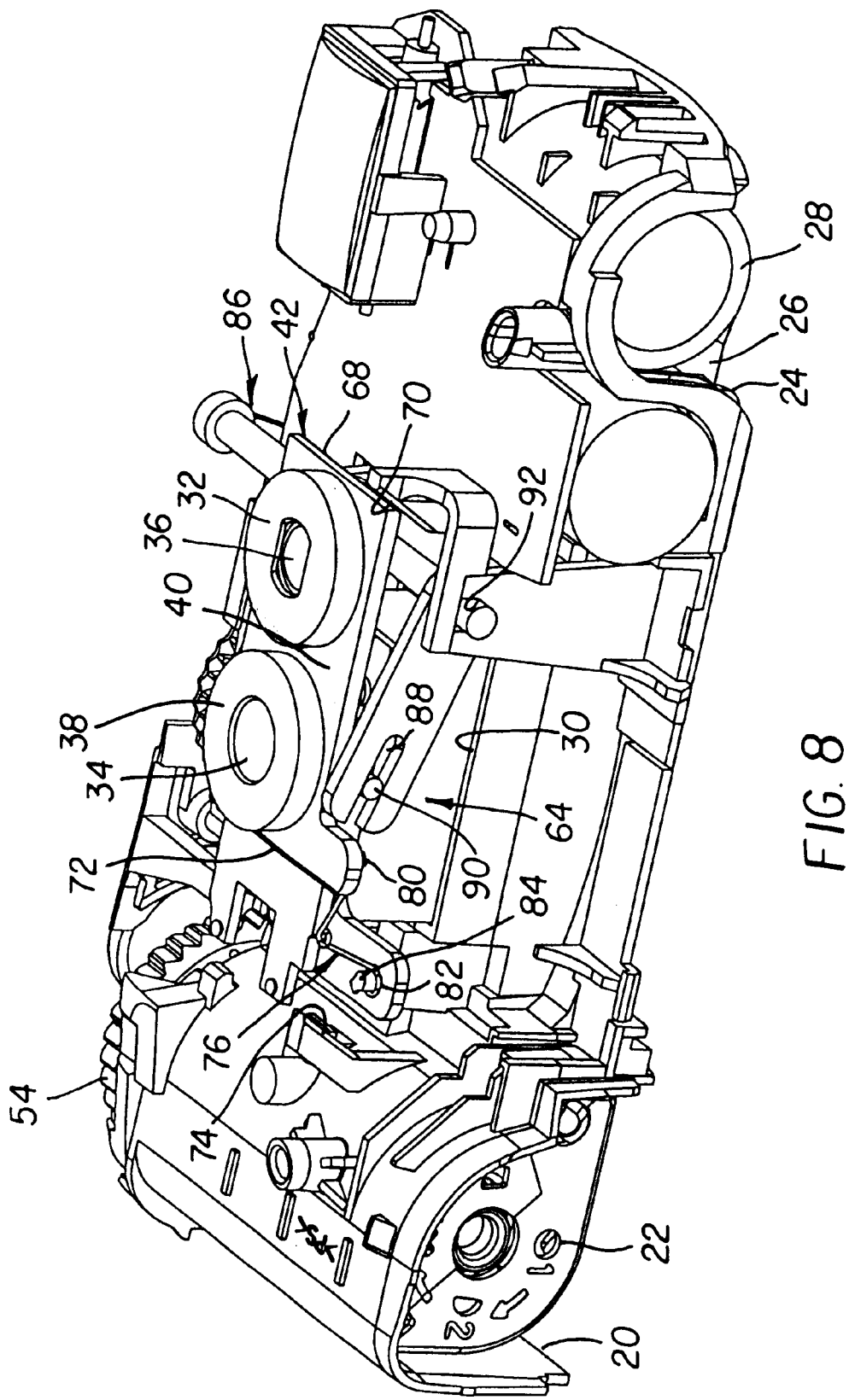
FIG. 8 is a an assembled front perspective view of the camera similar to FIG. 7.
Figure 9:
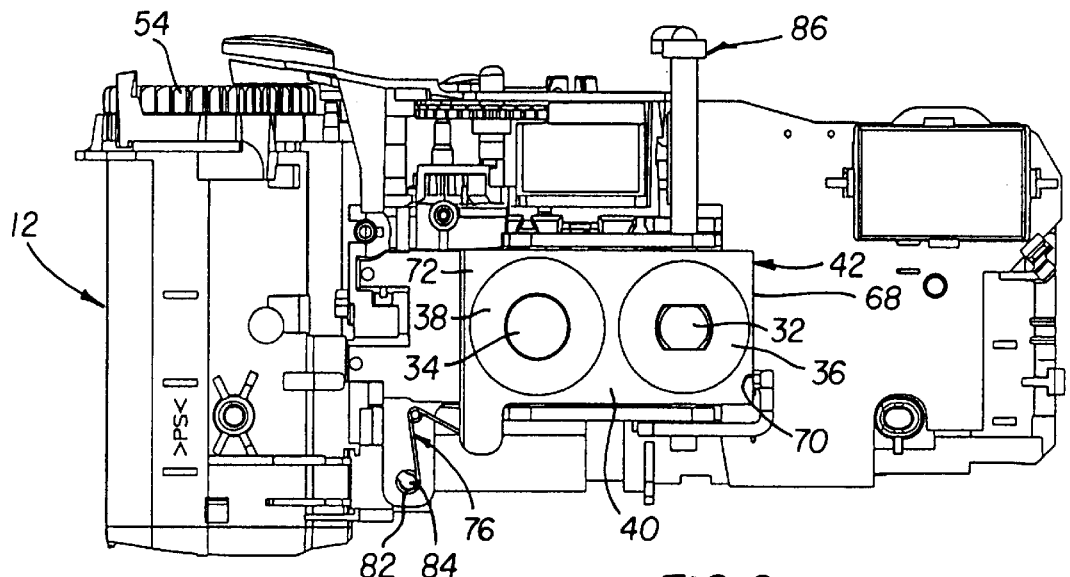
FIG. 9 is front elevation view of the camera with the front cover part removed, showing the lens carrier moved to position the longer focal length lens at the picture-taking axis.
Figure 10:
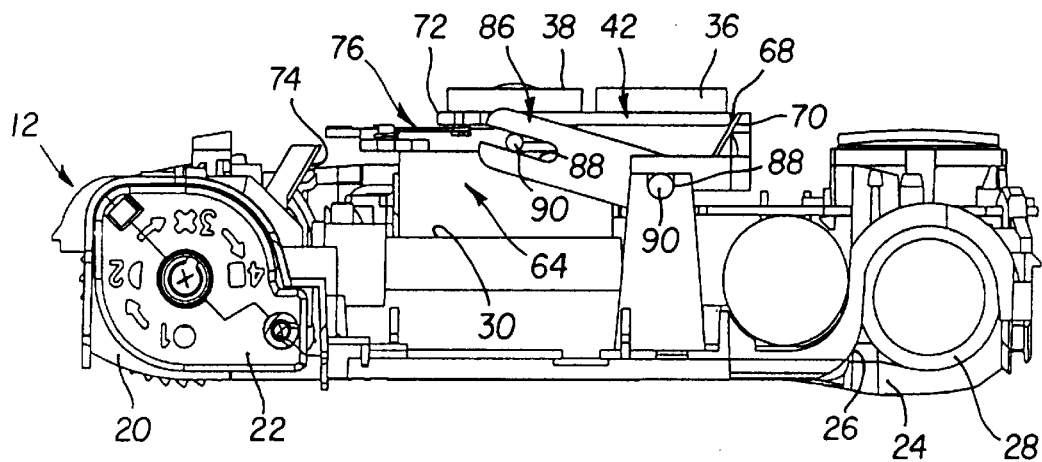
FIG. 10 is a bottom plan view of the camera as seen in FIG. 9.

As is typical, the main body part 12 has a rearwardly open cartridge receiving chamber 20 for a film cartridge 22 and a rearwardly open film supply chamber 24 for an unexposed filmstrip 26. See FIGS. 1 and 2. The unexposed filmstrip 26, except for a trailing end portion originally wound on a film take-up spool in the film cartridge 22 is substantially pre-wound into an unexposed film roll 28 in the film supply chamber 24 during manufacture of the one-time-use camera 10. A frontwardly and rearwardly open, rectangular-shaped exposure chamber 30, shown in FIGS. 1 and 2, is located between the cartridge receiving chamber 20 and the film supply chamber 24 for exposing successive frames of the filmstrip 26 when ambient light is received through a shorter focal length (wide angle) front taking lens 32 or a longer focal length (telephoto) front taking lens 34. The shorter focal length lens 32 is fixed immovably within a lens barrel 36 and the longer focal length lens 34 is fixed immovably within a lens barrel 38, and each one of the lens barrels is fixed immovably on the front side 40 of a lens carrier, preferably a flat lens plate 42. The light is received through a front lens opening 44 in the front cover part 14, through either one of the shorter and longer focal length lenses 32 and 34, through either one of respective light admitting openings 46 and 48 in the rear side 50 of the lens plate, through a single aperture 52, and into the exposure chamber 30. See FIG. 2. A single shutter blade (not shown) which normally blocks the aperture 52 is momentarily pivoted open to allow the light to enter the exposure chamber 30.

A manual film winder or film winding thumbwheel 54, rotatably supported on the main body part 12, above the cartridge receiving chamber 20, radially protrudes partially from an elongate narrow opening 56 in the rear cover part 16 and has a depending coaxial stem (not shown) in coaxial engagement with an exposed top end 58 of the film take-up spool in the film cartridge 22. The film winding thumbwheel 54 is manually grasped or fingered to rotate the thumbwheel in a film winding direction 60, i.e. counter-clockwise in FIGS. 1 and 2, to rotate the film take-up spool in the same direction. The thumbwheel 54 is incrementally rotated decreasing angles of rotation to incrementally rotate the film take-up spool the same decreasing angles in order to wind the respective frames of the filmstrip 26 from the unexposed film roll 28 in the film supply chamber 24, to the exposure chamber 30, and then onto the film take-up spool. The film take-up spool must be rotated the decreasing angles to wind the respective frames onto the spool, because the resulting film roll (not shown) on the spool increases in diameter with each added frame. When the filmstrip 26 is completely wound onto the take-up spool, a bottom cover-lid 62 for the cartridge receiving chamber 20 is disconnected from the main body part 12 to permit the film cartridge 22 to be removed from the chamber.

A rectangular-shaped light box 64 that includes the single aperture 52 is movable partially into and partially out of the exposure chamber 30, rearwardly and forwardly along a picture-taking axis 66. The single aperture 52 is centered about the picture-taking axis 66. See FIGS. 1, 2, 3, 6, 7 and 10. The lens plate 42 is supported on the light box 64, over the single aperture 52, via a known pin-in-slot coupling (not shown) between the lens plate and the light box, for translation forwardly and rearwardly along the picture-taking axis 66 in unity with the light box, and for translation relative to the light box perpendicular to the picture-taking axis. FIGS. 3–6 show the lens plate 42 moved relative to the light box 64 perpendicular to the picture-taking axis 64 to position the shorter focal length lens 32 at the picture-taking axis in line with the single aperture 52. The lens plate 42 has moved leftward in FIGS. 3–6. FIGS. 7–10 show the lens plate 42 moved relative to the light box 64 perpendicular to the picture-taking axis 64 to position the longer focal length lens 34 at the picture-taking axis in line with the single aperture 52. The lens plate 42 has moved rightward in FIGS. 7–10. A cam follower end 68 of the lens plate 42 cooperates with a motion inducing cam 70 on the main body part 12, when the lens plate is moved rearward along the picture-taking axis 66 in unity with the light box 64, in order to begin movement of the lens plate to position the shorter focal length lens 32 at the picture-taking axis. A cam follower end 72 of the lens plate 42 cooperates with a motion inducing cam 74 on the main body part 12, when the lens plate is moved forward along the picture-taking axis 66 in unity with the light box 64, in order to begin movement of the lens plate to position the longer focal length lens 34 at the picture-taking axis. A conventional over-center spring 76 between the cams 70 and 74 has one end 78 pivotably connected to a pin 80 on the lens plate 42 and another end 82 pivotably connected to a pin 84 on the light box 64 to complete movement of the lens plate to position either one of the shorter and longer focal length lenses 32 and 34 at the picture-taking axis 66.

A selector lever 86 for changing whichever one of the shorter and longer focal length lenses 32 and 34 is at the picture-taking axis 66 to the other lens, is coupled with the light box 64 via two identical slots 88 on the lever and respective pins 90 on the lens plate, and is supported for pivoting via two identical yokes 92 on the main body part 12. When the selector lever 86 is manually pivoted counter-clockwise as in FIGS. 3–6, it moves the light box 64 rearwardly along the picture-taking axis 66, partially into the exposure chamber 30, to remove the longer focal length lens 34 from being at the picture-taking axis and to position the shorter focal length lens 32 at the picture-taking axis. When the selector lever 86 is manually pivoted clockwise as in FIGS. 7–10, it moves the light box 64 forwardly along the picture-taking axis 66, partially out of the exposure chamber 30, to remove the shorter focal length lens 32 from being at the picture-taking axis and to position the longer focal length lens 34 at the picture-taking axis.

A known mask (not shown) is movable into a viewfinder 94 on the main body part 12 for changing the format (aspect ratio) of the view through the viewfinder to correspond with the change of positioning the longer focal length lens 34 at the picture-taking axis 66 in place of the shorter focal length lens 32. The mask is removed from the viewfinder 94 when the shorter focal length lens 32 is re-positioned at the picture-taking axis 66 in place of the longer focal length lens 34.

The invention has been described with reference to a preferred embodiment. However, it will be appreciated that variations and modifications can be effected by a person of ordinary skill in the art without departing from the scope of the invention.

PARTS LIST 10. one-time-use camera
12. main body part
14. front cover part
16. rear cover part
18. hook-in-hole connections
20. cartridge receiving chamber
22. film cartridge
24. film supply chamber
26. filmstrip
28. unexposed film roll
30. exposure chamber
32. shorter focal length lens
34. longer focal length lens
36. lens barrel
38. lens barrel
40. front side
42. lens plate
44. front lens opening
46. light admitting opening
48. light admitting opening
50. rear side
52. single aperture
54. film winding thumbwheel
56. elongate narrow opening
58. exposed top end of film take-up spool
60. film winding direction
62. bottom cover-lid
64. light box
66. picture-taking axis
68. cam follower end
70. motion inducing cam
72. cam follower end
74. motion inducing cam
76. over-center spring
78. spring end 80. pin
82. spring end
84. pin
86. selection lever
88. slots
90. pins
92. yokes
94. viewfinder

What is claimed is:

1. A dual lens camera comprising a lens carrier with a shorter focal length lens and a longer focal length lens for alternatively positioning only one of said lenses at a picture-taking axis, is characterized in that:

a single aperture for each one of said lenses is movable forward and rearward along the picture taking axis; and said lens carrier is movable across the picture-taking axis to position said shorter focal length lens at the picture-taking axis when said aperture is moved rearward along the picture-taking axis and to position said longer focal length lens at the picture-taking axis when said aperture is moved forward along the picture-taking axis.

2. A dual lens camera comprising a lens carrier with a shorter focal length lens and a longer focal length lens for alternatively positioning only one of said lenses at a picture-taking axis, is characterized in that:

a single aperture for each one of said lenses is movable forward and rearward along the picture taking axis; and said lens carrier is movable forward and rearward along the picture-taking axis in unity with said aperture, and is movable relative to said aperture to position said shorter focal length lens at the picture-taking axis when said aperture is moved rearward along the picture-taking axis and to position said longer focal length lens at the picture-taking axis when said aperture is moved forward along the picture-taking axis.

3. A dual lens camera as recited in claim 2, wherein respective lens barrels contain said shorter and longer focal length lenses and are fixed immovably on said lens carrier, and said lens carrier is movable perpendicular to the picture-taking axis to change whichever one of said shorter and longer focal length lenses is positioned at the picture-taking axis to the other lens.

4. A dual lens camera as recited in claim 2, wherein one motion inducing cam is positioned to impart motion to said lens carrier when said lens carrier is moved rearward along the picture-taking axis, in order to begin movement of said lens carrier to position said shorter focal length lens at the picture-taking axis, and another motion inducing cam is positioned to impart motion to said lens carrier when said lens carrier is moved forward along the picture-taking axis, in order to begin movement of said lens carrier to position said longer focal length lens at the picture-taking axis.

5. A dual lens camera as recited in claim 4, wherein an over-center spring is positioned between said motion inducing cams to complete movement of said lens carrier to position either one of said shorter focal length lens and said longer focal length lens at the picture-taking axis.

6. A dual lens camera as recited in claim 4, wherein said lens carrier includes a lens plate supporting said shorter focal length lens and said longer focal length lens and having opposite cam follower ends one of which is positioned to cooperate with one of said motion inducing cams when said lens carrier is moved rearward along the picture-taking axis, in order to begin movement of said lens carrier to position said shorter focal length lens at the picture-taking axis, and another of which is positioned to cooperate with the other motion inducing cam when said lens carrier is moved forward along the picture-taking axis, in order to begin movement of said lens carrier to position said longer focal length lens at the picture-taking axis.

7. A dual lens camera as recited in claim 2, wherein a selector lever is coupled with said aperture and is manually pivotable in opposite directions to move said aperture forward and rearward along the picture-taking axis.

8. A dual lens camera as recited in claim 2, wherein a main body part has an exposure chamber concentric about the picture-taking axis, and a light box includes said aperture and is movable into and out of said exposure chamber to move said aperture rearward and forward along the picture-taking axis.

9. A dual lens camera as recited in claim 8, wherein said lens carrier resides on said light box to be moved forward and rearward along the picture-taking axis in unity with said aperture and is movable on said light box to move relative to said aperture and change whichever one of said shorter and longer focal length lenses is positioned at the picture-taking axis to the other lens.

10. A method in a dual lens camera of changing whichever one of a shorter focal length lens and a longer focal length lens is positioned at a picture-taking axis to the other lens, comprising the steps:

pivoting a selection lever coupled with a single aperture for each one of the shorter and longer focal length lenses to move the aperture forward and rearward along the picture taking axis; and moving a single lens carrier for the shorter and longer focal length lenses forward and rearward along the picture-taking axis in unity with the aperture, and simultaneously moving the lens carrier relative to the aperture to position the shorter focal length lens at the picture-taking axis when the aperture is moved rearward along the picture-taking axis and to position the longer focal length lens at the picture-taking axis when the aperture is moved forward along the picture-taking axis.

* * * * *